United States Patent

Eck et al.

[11] Patent Number: 6,026,656
[45] Date of Patent: Feb. 22, 2000

[54] CRYSTALLIZATION BY EVAPORATION AND VAPOR CONDENSATION

[75] Inventors: Bernd Eck, Viernheim; Jörg Heilek, Bammental, both of Germany

[73] Assignee: BASF Aktiengesellschaft, Ludwigshafen, Germany

[21] Appl. No.: 09/069,155

[22] Filed: Apr. 29, 1998

[30] Foreign Application Priority Data

Apr. 29, 1997 [DE] Germany ............... 197 18 088

[51] Int. Cl.$^7$ ........................................ B01D 9/04
[52] U.S. Cl. .................................... 62/532; 62/123
[58] Field of Search ........................... 62/532, 123

[56] References Cited

U.S. PATENT DOCUMENTS

| | | | |
|---|---|---|---|
| 3,963,424 | 6/1976 | Bella, Jr. ........................ | 23/296 |
| 5,061,306 | 10/1991 | Cheng ........................ | 62/937 |
| 5,230,769 | 7/1993 | Jancic et al. .................. | 62/532 |
| 5,400,618 | 3/1995 | Dekraker ........................ | 62/532 |

FOREIGN PATENT DOCUMENTS

| | | |
|---|---|---|
| 7-82210 | 3/1995 | Japan . |
| 91/13301 | 9/1991 | WIPO . |

OTHER PUBLICATIONS

*Patent Abst. of Japan*, vol. 95, No. 6, Jul. 28, 1995 (English abstract of JP 07 082210, Mar. 28, 1995).
L.C. Dickey/Desalination 104 (1996) 155–163.
Heat and Mass transfer Characteristics of a New Combined Absorber–Evaporator, 31 (1996) 291–299.

*Primary Examiner*—Ronald Capossela
*Attorney, Agent, or Firm*—Keil & Weinkauf

[57] ABSTRACT

In a process for crystallizing material to be isolated, fluid is vaporized from a melt or a solution comprising the material to be isolated and the fluid and the vaporized fluid is condensed or absorbed in a liquid material to form a liquid mixture, wherein the fluid components to be condensed/absorbed have partial pressures over the liquid mixture which are smaller than the partial pressures of these components over the crystallizing solution/melt and the freezing point of the liquid mixture is lower than the condensation/absorption temperature in the liquid mixture.

19 Claims, 5 Drawing Sheets

CH₃COO₄

CH₃COO₄

CRYSTALLIZATION BY EVAPORATION AND VAPOR CONDENSATION

The present invention relates to a process for crystallizing material to be isolated by vaporizing fluid from a melt or solution which comprises the material to be isolated, the fluid and possibly further components and condensing the vaporized fluid (vapor) in a liquid material to form a liquid mixture.

Crystallization processes are used in many ways for solids formation and/or purification of organic or inorganic substances. Examples are processes for the crystallization of sodium chloride, sugar, ammonium sulfate, soda and adipic acid.

Depending on the way in which the supersaturation necessary for solids formation is produced, a distinction is made between cooling crystallization processes and evaporation crystallization processes. While in the case of cooling crystallization solids formation occurs as a result of cooling the solution/melt to be crystallized, in the case of evaporation crystallization the solubility limit of the solid to be crystallized in the solution/melt is exceeded by evaporation of one or more components of the solution/melt (removal of solvent). The vapor leaving the crystallization apparatus in the evaporation crystallization usually has to be condensed in a condensation apparatus.

The condensed vapor can, if required, be returned partially or completely to the crystallization apparatus (reflux of the condensate). Since in the reflux method of crystallization only part, if any, of the solvent is removed, but in any case heat is removed by means of the evaporation, this procedure is also known as boiling cooling. Boiling cooling can be classified between pure cooling and pure evaporation methods (without recirculation of the condensed vapor).

Compared to a cooling crystallization process employing indirect cooling via heat exchangers, the boiling cooling process has the great advantage of direct cooling of the solution/melt to be crystallized (direct removal of the heat of vaporization from the solution/melt to be crystallized). This avoids operating problems as a result of encrustations as usually occur in the heat exchangers used in indirect cooling.

The published Japanese patent application JP 07082210-A discloses a process for purifying acrylic acid in which water is added to crude acrylic acid containing little or no water. Parts of the acrylic acid/water mixture are vaporized in order to bring about adiabatic cooling under reduced pressure, which results in precipitation of acrylic acid crystals which are separated off. Here, the water content of the coexisting mother liquor is from 2 to 10% by weight. In the evaporation, vapor is passed into a condenser while acrylic acid flows on the surface of the condenser in order to prevent ice formation. Alternatively, water flows on the surface of the condenser in order to prevent precipitation of acrylic acid crystals.

U.S. Pat. No. 5,061,306 describes a VFVPE process (Vacuum Freezing Vapour Pressure Enhancement) which is carried out in a plurality of stages. In this process, water is vaporized from a dilute aqueous solution at a pressure below the triple point pressure. The water vapor is absorbed in a highly concentrated aqueous condensation mixture (eg. lithium bromide, calcium chloride) which is warmer than the crystallizing solution but has a lower partial pressure of water vapor. The heat of absorption is used to vaporize pure water at a pressure level above the triple point pressure (Pressure Enhancement). In this process, water also crystallizes out. This VFVPE process is also described as a use example in an article in Heat and Mass Transfer, 31, (1996), 291–299, which is concerned with mass and heat transfer in the absorption of water vapor in a condensation mixture. In an article from Desalination, 104, (1996), 155–163, water vapor is condensed/absorbed in a relatively highly concentrated salt solution (NaCl) as condensation mixture. This process is described as "Vacuum Freezing" or "Freeze Concentration". It is used in the freeze concentration of foodstuffs or desalination of water. In all of the processes disclosed in the three literature references, water is the substance which is crystallized and vaporized.

It is an object of the present invention to improve the processes of evaporation crystallization and crystallization by boiling cooling so as to achieve areas of application which are wider than those of the previously known processes and achieve advantages in terms of the economics of these processes.

We have found that this object is achieved by crystallizing material to be isolated by vaporizing fluid from a melt or solution which comprises the material to be isolated and fluid and condensing or absorbing the vaporized fluid (vapor) in a liquid material. This forms a liquid mixture over which the fluid components to be condensed/absorbed have partial pressures which are less than the partial pressures of these components over the crystallizing solution/melt and whose freezing point is lower than the condensation/absorption temperature.

The present invention accordingly provides a process for crystallizing material to be isolated by vaporizing fluid from a melt or solution which comprises the material to be isolated, the fluid and possibly further components and condensing or absorbing the vaporized fluid (vapor) in a liquid material to form a liquid mixture, where the material to be isolated is selected from the group consisting of:

(a) inorganic salts and salts of organic compounds and their solvates, preferably hydrates, which are present in admixture with water and/or organic solvents as fluid, (b) organic components which are present in a narrow-boiling mixture with organic compounds and/or water, where the gaseous and liquid phases which are in equilibrium at the crystallization pressure and temperature have concentration differences of <10% by weight in respect of the material to be isolated, the organic compounds and/or water, (c) alkanediols which are present in admixture with water and/or organic compounds, and (d) organic components which are present in admixture with organic compounds and/or water, where the organic component to be isolated has a lower boiling point than the organic compounds and/or water, wherein the fluid components to be condensed/absorbed have partial pressures over the liquid mixture which are less than the partial pressures of these components over the crystallizing solution/melt and the freezing point of the liquid mixture is lower than the condensation/absorption temperature in the liquid mixture.

Preferred embodiments of the invention are described in the subclaims, the description below together with the examples and the figures.

Figure 1:
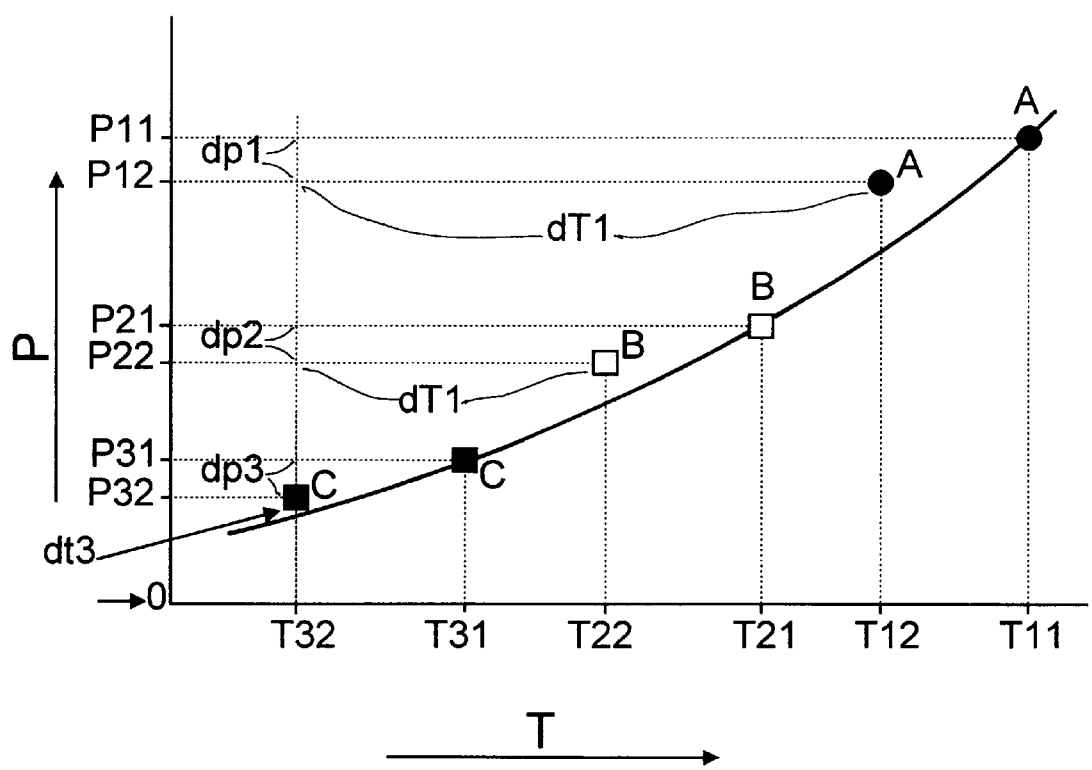
FIG. 1 shows generally a vapor pressure diagram.

The crystallization methods and equipment used in the process of the present invention are in principle subject to no restriction. Suitable crystallization methods are all those in which mixing of the crystallizing solution/melt is achieved by stirring or circulation, both in continuous and in batchwise mode. As regards equipment, preference is given to using stirred tank crystallizers and forced circulation crystallizers, but tube and moving-bed crystallizers can also be used. Crystallization can be carried out from the melt or from solution. Likewise, the condensation methods and equipment and the way in which the material and heat-exchange surfaces required for condensation are produced are subject to no restriction. The exchange surface is preferably produced by spraying the liquid mixture, hereinafter also referred to as the condenser mixture, and/or trickling the condenser mixture over equipment surfaces and/or internal fittings and/or packing elements.

The materials to be isolated, which are present in admixture with fluid and possibly further components, are:

(a) inorganic salts and salts of organic compounds and their solvates, in particular hydrates, preferably having crystallization temperatures below 40° C., which are present in admixture with water and/or organic solvents as fluid; preferred examples are $Na_2SO_4.10H_2O$, sodium acetate $NaC_2H_3O_2.3H_2O$, $KOH.2H_2O$ and NaOH-hydrate, e.g. $NaOH.3.5H_2O$ preferably $NaOH.3.5H_2O$;

(b) an organic component which is present in narrow-boiling mixtures with organic compounds and/or water, where the gaseous and liquid phases which are in equilibrium with one another at the crystallization pressure and temperature have no significant differences in composition in respect of the main components (ie. material to be isolated and solvent or fluid) and therefore also have similar freezing points; in this context, "not significant" means that the differences in the concentrations of the main components in the gaseous and liquid phases are <10% by weight; preferred examples: acetic acid as material to be isolated with a water/acetic acid mixture as fluid; the relationships for the preferred proportions by mass of acetic acid and water are shown below:

$$|x^v_{ACA} - x^l_{ACA}| < 10\%$$

$$|x^v_{H2O} - x^l_{H2O}| < 10\%$$

where x=proportion by mass; v=vapor; l=liquid; ACA= acetic acid and $H_2O$=water;

(c) alkanediols which are present in admixture with organic compounds and/or water; preferred examples are 1,4-butanediol and 1,6-hexanediol;

(d) an organic component which is present in admixture with organic compounds and/or water, where the organic component to be isolated (crystallized) has a lower boiling point than the organic compounds and/or water and, for this reason, the vapor which is in equilibrium with the liquid phase at the crystallization pressure/temperature cannot be condensed without formation of solid; preferred examples are: p-xylene as component to be isolated in admixture with o-xylene and/or m-xylene.

The organic solvents or organic compounds being present as fluid of the groups (a) to (d) are preferably selected from the groups of the alcohols, ethers, ketones, esters, aldehydes, carboxylic acids, paraffins and halogenated hydrocarbons. The concentration of the material to be isolated (a) to (d) in the mixture from which it is to be separated is greater than in the case of the eutectic composition; the concentration of the material to be isolated is preferably at least 10% by weight, in particular from 20 to 95% by weight, based on the mixture from which it is to be separated.

According to the present invention, the material to be isolated is the crystallizing material. While in the case of the material to be isolated (a) the vaporizing fluid is essentially free of material to be isolated, this is not necessarily the case for the materials to be isolated (b) to (d). In the case of the latter components, there is usually no vapor of a pure substance, but instead a fluid which contains material to be isolated in addition to other components.

The liquid material in which the vapor is condensed/absorbed is subject to no particular restriction per se. Suitable liquid materials are all those which during/after introduction of the vapor lead to a liquid mixture over which the fluid components to be condensed/absorbed have partial pressures which are less than the partial pressures of these components over the crystallizing solution/melt and whose freezing point is lower than the condensation/absorption temperature.

The liquid material used is advantageously completely or partially solution or melt to be crystallized or mother liquor from the crystallization, or partly crystal suspension, or a mixture thereof. This process configuration has the advantage that no auxiliaries extraneous to the system are required for producing the liquid material. This makes separate work-up or disposal of the liquid mixture (condenser mixture) superfluous. Particularly in the case of boiling cooling (with reflux into the crystallization), this procedure avoids the use of extraneous materials which could have an adverse effect on the crystallization. An auxiliary can also be used in a crystallization by boiling cooling, but this is then preferably selected such that it has a lower boiling point than the components present in the solution to be crystallized. The auxiliary here can also be a mixture of auxiliaries. In a preferred embodiment, the liquid material is a single-phase liquid mixture. A two-phase liquid mixture is also possible, for example when using a crystal suspension. The liquid mixture formed after introducing the vapor into the liquid material can be completely or partly returned to the crystallization.

The crystallization is preferably carried out at a pressure of from 0.1 mbar to 1 bar, in particular at from 1 to 150 mbar, and at a temperature from 0.5 to 50 K below the melting point of the particular material to be isolated. The temperature of the liquid mixture formed after introduction of the vapor into the liquid material is preferably lower than the saturated vapor temperature of the vapor. In a preferred embodiment of the freezing point of the liquid mixture is lower than the freezing point of the vapor.

The crystallization can be carried out as an evaporation crystallization, ie. without recirculation of the condensed vapor, or as a boiling cooling with partial or complete recirculation of the condensed vapor.

FIG. 1 shows a generalized vapor pressure diagram with vapor pressure curve of a solution/melt in the crystallizer with the pressure p as ordinate and the temperature T as abszisse. Basically, in vaporization crystallization processes and crystallization processes employing boiling cooling, the temperature of the crystal suspension in the crystallization apparatus $T_{cryst}$ is determined by the pressure $p_{cryst}$ prevailing in the apparatus. The temperature $T_{cond}$ necessary for condensation of the vapor is fixed by the dew point of the vapor to be condensed corresponding to the condensation pressure $p_{cond}$. The condensation pressure $p_{cond}$ is less than the pressure $p_{cryst}$ by an amount corresponding to the flow-dynamic pressure drop dp between crystallization apparatus and condensation apparatus. The temperature $T_{cryst}$ prevailing in the crystallization apparatus is thus, for a given pressure drop dp, fixed by the temperature $T_{cond}$ set in the condenser. FIG. 1 shows three operating points A, B and C for high temperatures (operating point 1, in FIG. 1 represented by "A"), for medium temperatures (operating point 2, in FIG. 1 represented by "B") and for minimal temperatures (operating point 3, in FIG. 1 represented by "C"). For each operating point the corresponding temperature of the crystal suspension in the cristallisation appartus, $T_{cryst}$, which is determined by the pressure $p_{cryst}$ prevailing in the apparatus, is indicated, for operating point 1 or A for crystallisation by $T_{11}$ and $P_{11}$, for operating point 2 or B for crystallisation by $T_{21}$, and $p_{21}$ and for operating point 3 or C for crystallisation by $T_{31}$ and $P_{31}$. Correspondingly, the temperature $T_{cond}$ necessary for condensation of the vapor is represented by $T_{12}$, $T_{22}$ and $T_{32}$, respectively, for the three operating points A, B and C for condensation in FIG. 1, while the corresponding condensation pressure $p_{cond}$ is indicated by $P_{12}$, $P_{22}$ and $P_{32}$, respectively. $dp_1$, $dp_2$ and $dp_3$ designate the flow-dynamic pressure drop of the condensation presssure $P_{12}$, $P_{22}$ and $P_{32}$, respectively, relative to the pressure $p_{11}$, $p_{21}$ and $p_{31}$, respectively. $dT_1$, $dT_2$ and $dT_3$ designate the maximum temperature drop $dT_{HEmax}$ available for heat transfer in the condenser (temperature difference between dew point of the vapor and freezing point of the condensate) for the three operating points. In other words, the lowest temperature $T_{cryst.min}$, which corresponds to $T_{31}$ in FIG. 1, which can be achieved in the crystallization apparatus is fixed by the lowest temperature $T_{cond.min}$, which corresponds to $T_{32}$ in FIG. 1, which can be set in the condenser (=freezing temperature of the vapor to be condensed, cf. operating point 3 or C of FIG. 1) since solids formation in the condensation apparatus is to be avoided for reasons of heat transfer and/or operational reliability.

Compared to the known processes in which the vapor is not introduced into a liquid material to form a liquid mixture, the process of the present invention has the following advantages:

it is possible to crystallize solutions/melts whose freezing points are below $T_{cryst.min}$ using evaporation crystallization processes or boiling cooling processes;

in all cases in which the operating temperature of the crystallization has to come close to the lowest possible crystallization temperature $T_{cryst.min}$ because the solutions/melts have low freezing points, the maximum temperature drop $dT_{HE,max}$ available for heat transfer in the condenser (temperature difference between dew point of the vapor and freezing point of the condensate) when using a liquid material according to the present invention does not become as small as in the known processes (cf. FIG. 1, from state 1 (A) via 2 (B) to 3 (C). The required heat-transfer area of the apparatus and thus the capital costs are reduced accordingly;

the minimum vapor pressure of the condensate in the condenser is fixed by the restriction that the minimum condensation temperature is equal to the freezing point of the vapor to be condensed. This fixes the smallest possible, incondensable residual vapor stream which, together with incondensable inert gases, has to leave the condenser again. In the case of vacuum condensation, this requires a minimum size of the vacuum unit in terms of pumping capacity for incondensable residual gases. For the same condenser pressure, this minimum size increases with increasing minimum vapor pressure of the condensate in the condenser. The process of the present invention reduces this minimum size of the vacuum unit.

The invention is illustrated by the following examples together with FIGS. 2 to 5 which each represent preferred embodiments of the invention.

EXAMPLE 1

Figure 2:
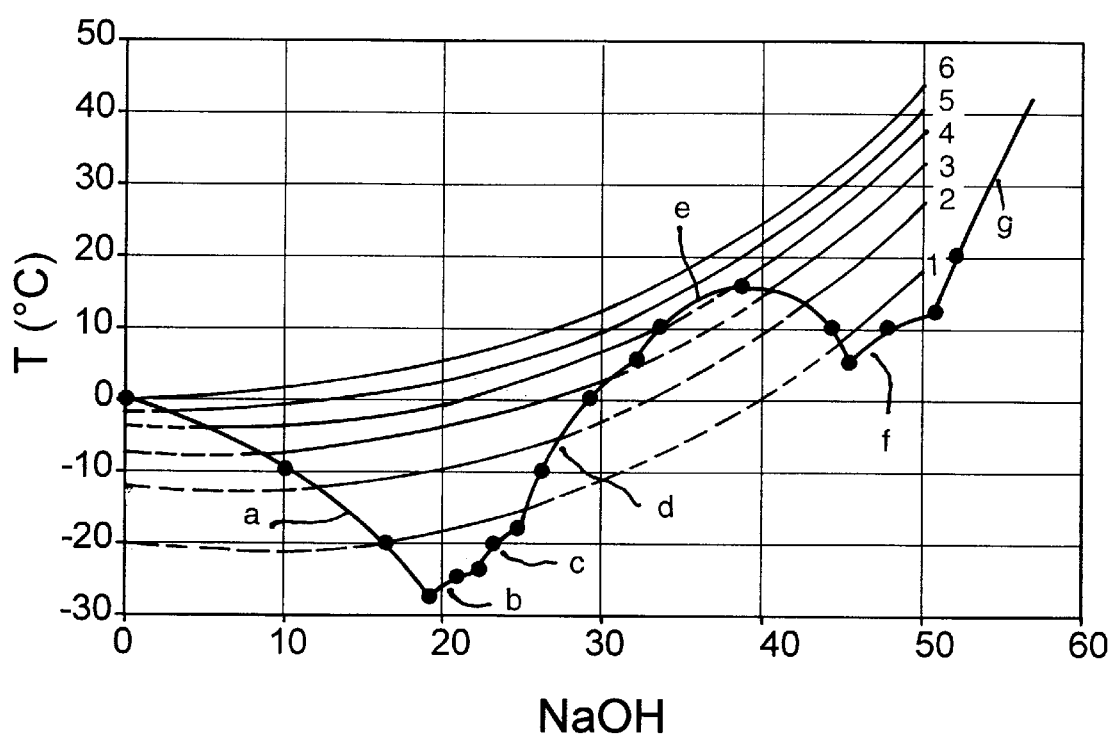
FIG. 2 shows the phase diagram for $NaOH/H_2O$.

Crystallization of NaOH.3.5H$_2$O From an NaOH/ H$_2$O Mixture By Boiling Cooling FIG. 2 shows the phase diagram of the binary system NaOH/H$_2$O wherein the temperature is indicated in ° C. on the ordinate and the percentage of NaOH is indicated in % by weight on the abszisse. For the isobars designated with the numerals 1 to 6, the respective numerals inidicate the pressure in mbar (e.g. 1 mbar for isobar 1). The letters a to g designate the following phases: a is ice, b is NaOH.7H$_2$O, c is NaOH.5H$_2$O, d is NaOH.4H$_2$O, e is NaOH.3.5H$_2$O, f is NaOH.2H$_2$O and g is NaOH.1H$_2$O. It can be seen from this diagram that the hydrate NaOH.3.5H$_2$O (e) can be crystallized only below temperatures $T_{cryst} \leq 15.5°$ C. The isobars (boiling curves of the NaOH/H$_2$O mixtures) drawn in on the phase diagram show that a pressure in the crystallization apparatus of $p_{cryst} \leq 4.5$ mbar is necessary to vaporize water from mixtures from which NaOH.3.5H$_2$O (e) can be crystallized. Owing to flow-dynamic pressure drops, the condensation pressure $p_{cond}$ is below the crystallization pressure $p_{cryst}$, eg. $p_{cond} \leq 4$ mbar. The vapor formed during evaporation consists of water which has a freezing point of 0° C. at a vapor pressure of $p_{H2O}$=6.1 mbar. Thus, water can no longer be condensed in liquid form at a condensation pressure of $p_{cond} \leq 4$ mbar. In order to achieve a condensation pressure of $p_{cond} \leq 4$ mbar, the condensation temperature $T_{cond}$ would have to be reduced to $\leq -5°$ C. However, this would lead to freezing of the condensate (ice formation), which is to be prevented.

According to the invention, this problem is solved by producing a condenser mixture which consists of 5–30% by weight of NaOH and water as the remainder. Preference is given to using a mixture which consists of 19% by weight of NaOH and 81% by weight of water. The latter mixture can be cooled to temperatures down to −25° C. without solids formation in the mixture occurring. Even at from −10 to −20° C., this mixture has a vapor pressure of only from 1 to 2 mbar, so that the vapor formed in the crystallization (eg. at $T_{cryst}$=15.5° C., $p_{cryst}$=4 mbar) can be condensed in this mixture without problems and at a great temperature difference between vapor and condenser mixture.

Figure 3:
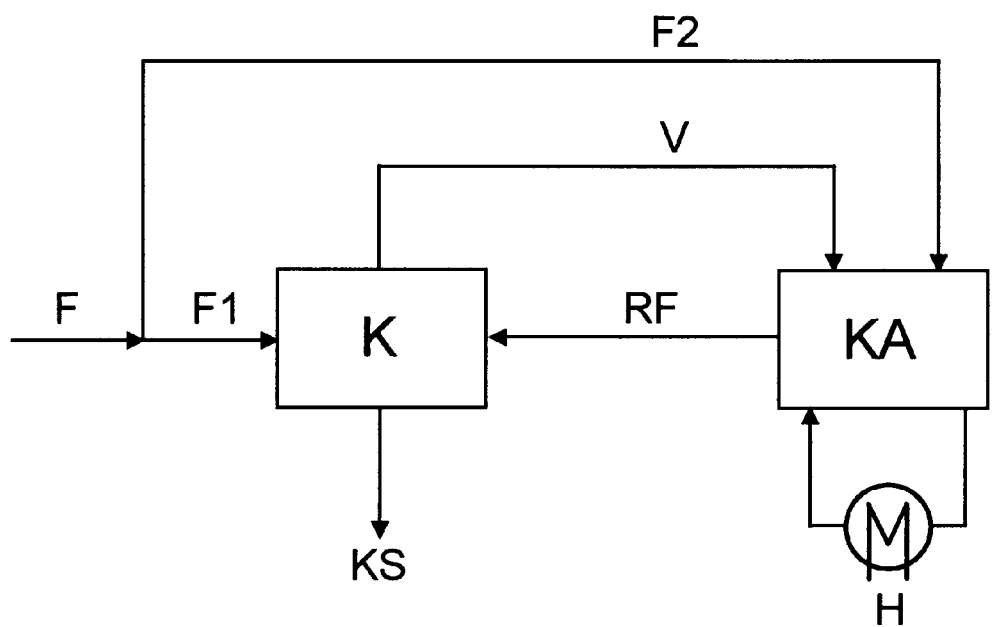
FIG. 3 shows a process flow diagram for the crystallization of $NaOH \cdot 3.5H_2O$ by boiling cooling.

FIG. 3 shows a process according to the present invention for producing the condenser mixture. A part F1 of the incoming feed stream F is conveyed directly to the crystallization K, another part F2 of the feed stream F is fed to the condensation apparatus KA and mixed with the vapor stream V. The ratio of the stream F2 to the stream V is selected such that a condenser mixture of the desired composition is formed. The heat of condensation is removed from the condenser mixture by means of a conventional heat exchanger H and the cooled mixture is returned to the crystallization K as stream RF. The crystals formed as a result of the heat removal in the crystallization K are discharged from the crystallization in the crystal suspension stream KS. The crystals produced can be separated from the suspension by known methods (filtration, sedimentation). The remaining mother liquor can be returned completely, but generally only in part or not at all, to the crystallization. Mother liquor to be discharged is taken from the system and can be worked up by known methods or be discarded. As regards the compositions of feed stream F and condenser mixture (=stream RF), it is only necessary that the feed stream has to have a higher NaOH concentration than the desired condenser mixture (eg. feed stream F containing 38.8% of NaOH and stream RF containing 19% of NaOH).

EXAMPLE 2

Figure 4A:
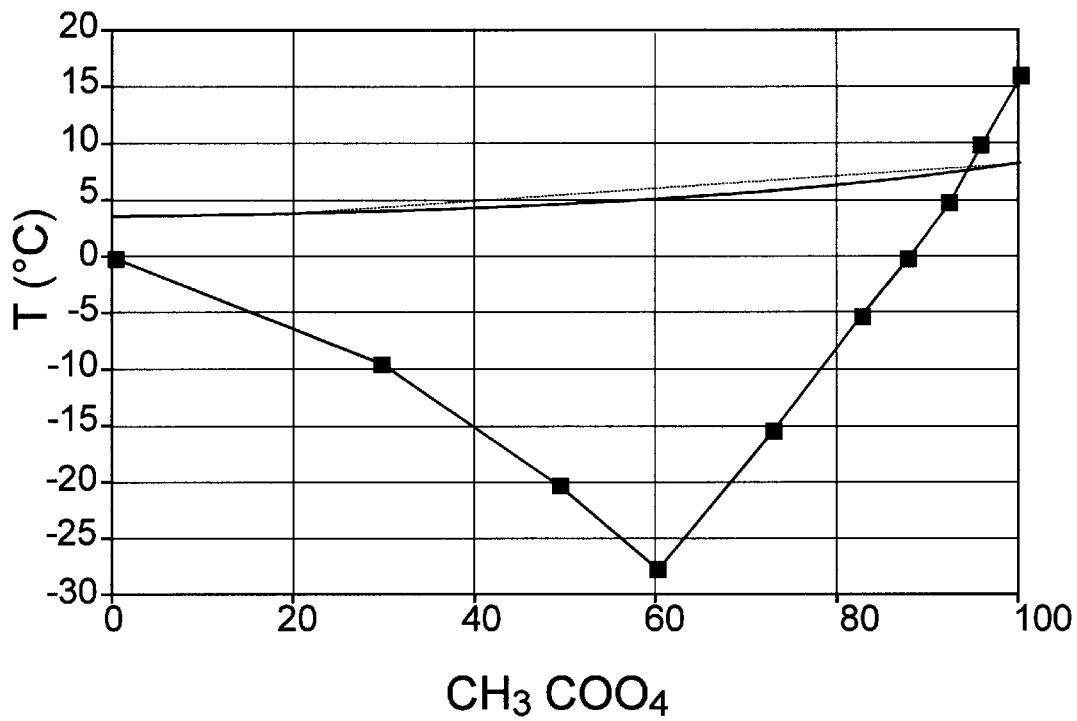
FIG. 4A shows the phase diagram for the system acetic acid/$H_2O$.
Figure 4B:
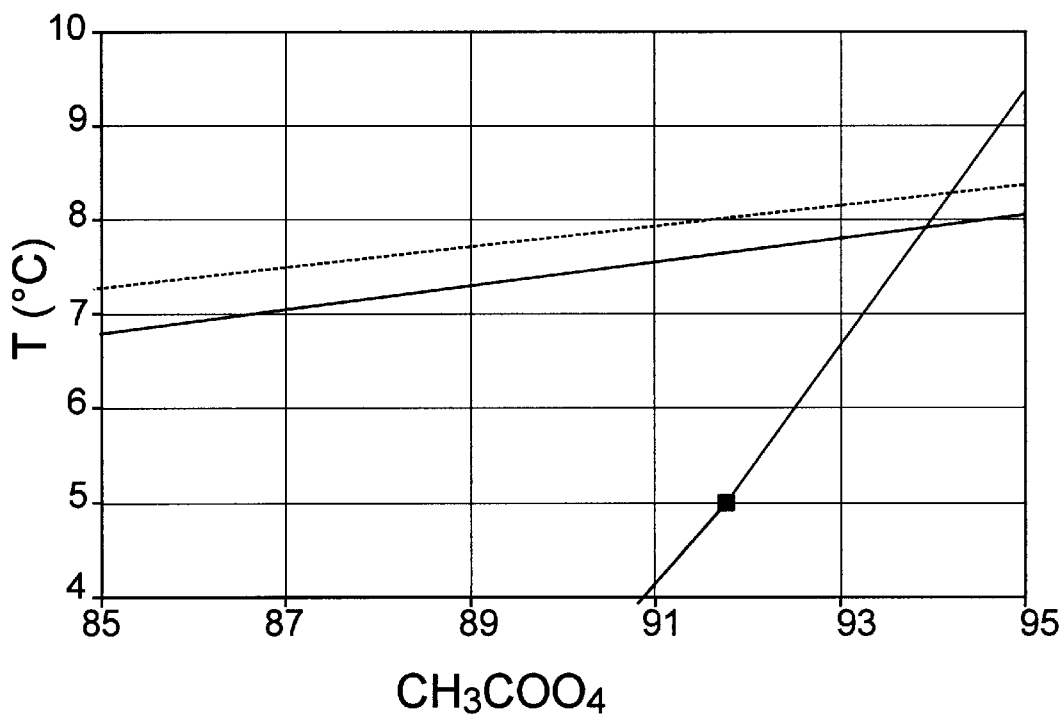
FIG. 4B shows a magnified section of FIG. 4A.

Crystallization of Acetic Acid From an Acetic Acid/Water Mixture By Boiling Cooling The phase diagram of the binary, narrow-boiling mixture acetic acid/$H_2O$ is shown in FIG. 4A. FIG. 4B shows a magnified section of the phase diagram of FIG. 4A. In FIGS. 4A and 4B, the temperature T is indicated in ° C. on the ordinate and the percentage of acetic acid ($CH_3COOH$) is indicated in % by weight on the abszisse. The dotted line designates the dew point curve for 8 mbar, while the continuous line (without squares) indicates the boiling curve for 8 mbar. The operating point of the crystallizer is the point at which acetic acid (ACA) is crystallized from a mixture containing 94% of ACA and 6% of $H_2O$. The crystallization temperature is $T_{cryst}=8°$ C. and the crystallization pressure is $p_{cryst}=8$ mbar (see boiling curve 8 mbar in FIG. 4B). The vapor leaving the crystallization is composed of 92% of ACA and 8% of $H_2O$ (see associated dew point curve 8 mbar in FIG. 4B). Even when flow-dynamic pressure drops are disregarded, the dew point of the vapor (8° C. at $p_{cond}=8$ mbar) is only less than 3 Kelvin above the freezing point of the condensed vapor (freezing point 5.3° C. at the composition 92% ACA/8% $H_2O$). Thus, only a very small, not economically usable temperature difference of at most $dT_{HE,max}=2.7$ K, given by the difference between the dew point of the vapor and the freezing point of the condensed vapor, is available for heat removal from the condensate.

According to the present invention, the condensation is carried out using a condenser mixture containing from 20 to 80% of ACA, preferably 60% of ACA. The latter mixture can be cooled to −27° C. without the freezing point of the mixture being reached. There is therefore a significantly greater $dT_{HE,max}$ of 35 K (temperature difference between dew point of the vapor and freezing point of the condenser mixture) available for heat exchange in the condensation. The condensation stage is accordingly smaller and more economical. Furthermore, the vapor pressure of this condenser mixture is less than the vapor pressure of the pure, non-freezing vapor condensate so that a more economical (because it is smaller) vacuum unit can also be used.

Figure 5:
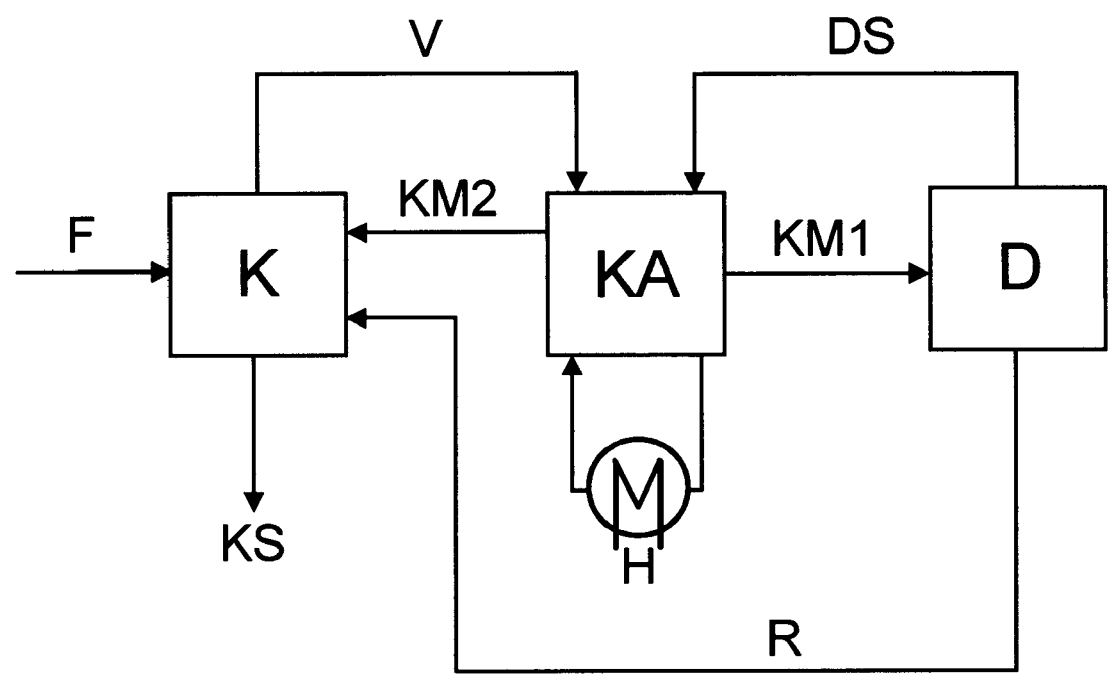
FIG. 5 shows a process flow diagram for the crystallization of acetic acid by boiling cooling.

FIG. 5 shows a further process according to the present invention for producing the condenser mixture. The feed stream F is conveyed directly to the crystallization K. The vapor V leaving the crystallization is mixed in the condensation KA with a distillate stream DS which is rich in water and low in ACA. The ratio of stream DS to stream V is selected such that a condenser mixture KM of the desired composition is formed. The part KM 1 of the condenser mixture is fed to the distillation D and fractionated into the water-rich distillate DS mentioned and the ACA-rich residue R. The residue R goes back into the crystallization K. The part KM 2 of the condenser mixture likewise goes back into the crystallization K. The heat of condensation is removed from the condenser mixture by means of a conventional heat exchanger H. The crystals formed by removal of heat in the crystallization are discharged from the crystallization in the crystal suspension stream KS. The suspension stream KS can, as described in Example 1, be treated and worked up. As regards the composition of feed stream F, it is only necessary that the feed stream F has to have an ACA concentration higher than that of the mixture from which ACA is crystallized in the crystallization (eg. feed stream F containing 99% of ACA and mixture in the crystallization containing 94% of ACA).

We claim:

1. A process for crystallizing material to be isolated comprising the steps of: a crystallization step of vaporizing fluid from a melt or solution which comprises the material to be isolated, the fluid and possibly further components, thereby crystallizing the material being isolated, said material being selected from the group consisting of:
   (a) inorganic salts and salts of organic compounds and their solvates, preferably hydrates, which are present in admixture with water and/or organic solvents as fluid,
   (b) organic components which are present in a narrow-boiling mixture with organic compounds and/or water, where the gaseous and liquid phases which are in equilibrium at the crystallization pressure and temperature have concentration differences of <10% by weight in respect of the material to be isolated, the organic compound and/or water,
   (c) alkanediols which are present in admixture with water and/or organic compounds, and
   (d) organic components which are present in admixture with organic compounds and/or water, where the organic component to be isolated has a lower boiling point than the organic compounds and/or water, and a step of condensing or absorbing the vaporized fluid (vapor) in a liquid material to form a liquid mixture, wherein the fluid components to be condensed/absorbed have partial pressures over the liquid mixture which are less than the partial pressures of these components over the crystallizing solution/melt and the freezing point of the liquid mixture is lower than the condensation/absorption temperature in the liquid mixture.

2. The process of claim 1, wherein the liquid material is a single-phase liquid mixture.

3. The process of claim 1, wherein the liquid material used is completely or partly solution or melt to be crystallized or mother liquor from the crystallization or partly crystal suspension, or a mixture thereof.

4. The process of claim 1, wherein the liquid mixture is returned completely or partly to the crystallization step.

5. The process of claim 1, wherein the material to be isolated is (a) sodium hydroxide hydrate, (b) acetic acid or (c) 1,4-butanediol and/or 1,6-hexanediol.

6. The process of claim 1, wherein the concentration of material to be isolated is greater in the mixture than at the eutectic composition, and in the mixture the concentration of material to be isolated is at least 10% by weight.

7. The process of claim 1, wherein the crystallization step is carried out at a pressure of from 0.1 mbar to 1 bar.

8. The process of claim 1, wherein the temperature of the liquid mixture is lower than the saturated vapor temperature of the vapor.

9. The process of claim 1, wherein the freezing point of the liquid mixture is lower than the freezing point of the vapor.

10. A process for crystallizing material to be isolated comprising the steps of: a crystallization step of vaporizing fluid from a melt or solution which comprises the material to be isolated, the fluid and possibly further components, thereby crystallizing the material being isolated, said material being selected from the group consisting of:
   (a) inorganic salts and salts of organic compounds and their solvates, preferably hydrates, which are present in admixture with water and/or organic solvents as fluid, (b) organic components which are present in a narrow-boiling mixture with organic compounds and/or water, where the gaseous and liquid phases which are in equilibrium at the crystallization pressure and temperature have concentration differences of <10% by weight in respect of the material to be isolated, the organic compound and/or water, (c) alkanediols which are present in admixture with water and/or organic compounds, and (d) organic components which are present in admixture with organic compounds and/or water, where the organic component to be isolated has a lower boiling point than the organic compounds and/or water, a step of condensing or absorbing the vaporized fluid (vapor) in a liquid material to form a liquid mixture, wherein the fluid components to be condensed/absorbed have partial pressures over the liquid mixture which are less than the partial pressures of these components over the crystallizing solution/melt and the freezing point of the liquid mixture is lower than the condensation/absorption temperature in the liquid mixture, wherein the liquid material is a single-phase liquid mixture, and returning completely or partly the liquid mixture to the crystallization step.

11. The process of claim 10, wherein the material to be isolated is (a) sodium hydroxide hydrate, (b) acetic acid or (c) 1,4-butanediol and/or 1,6-hexanediol.

12. The process of claim 10, wherein the concentration of material to be isolated is greater in the mixture than at the eutectic composition, and in the mixture the concentration of material to be isolated is at least 10% by weight.

13. The process of claim 10, wherein the temperature of the liquid mixture is lower than the saturated vapor temperature of the vapor.

14. The process of claim 10, wherein the freezing point of the liquid mixture is lower than the freezing point of the vapor.

15. A process for crystallizing material to be isolated comprising the steps of: a crystallization step of vaporizing fluid from a melt or solution which comprises the material to be isolated, the fluid and possibly further components, thereby crystallizing the material being isolated, said material being selected from the group consisting of:

(a) inorganic salts and salts of organic compounds and their solvates, preferably hydrates, which are present in admixture with water and/or organic solvents as fluid, (b) organic components which are present in a narrow-boiling mixture with organic compounds and/or water, where the gaseous and liquid phases which are in equilibrium at the crystallization pressure and temperature have concentration differences of <10% by weight in respect of the material to be isolated, the organic compound and/or water, (c) alkanediols which are present in admixture with water and/or organic compounds, and (d) organic components which are present in admixture with organic compounds and/or water, where the organic component to be isolated has a lower boiling point than the organic compounds and/or water, and a step of condensing or absorbing the vaporized fluid (vapor) in a liquid material to form a liquid mixture, wherein the fluid components to be condensed/absorbed have partial pressures over the liquid mixture which are less than the partial pressures of these components over the crystallizing solution/melt and the freezing point of the liquid mixture is lower than the condensation/absorption temperature in the liquid mixture, wherein the liquid material used is completely or partly solution or melt to be crystallized or mother liquor from the crystallization step or partly crystal suspension, or a mixture thereof, and returning completely or partly the liquid mixture to the crystallization step.

16. The process of claim 15, wherein the material to be isolated is (a) sodium hydroxide hydrate, (b) acetic acid or (c) 1,4-butanediol and/or 1,6-hexanediol.

17. The process of claim 15, wherein the concentration of material to be isolated is greater in the mixture than at the eutectic composition, and in the mixture the concentration of material to be isolated is at least 10% by weight.

18. The process of claim 15, wherein the temperature of the liquid mixture is lower than the saturated vapor temperature of the vapor.

19. The process of claim 15, wherein the freezing point of the liquid mixture is lower than the freezing point of the vapor.

* * * * *